United States Patent
Feddema (10) Patent No.: US 12,428,910 B1
(45) Date of Patent: Sep. 30, 2025

(54) GEAR REDUCER

(71) Applicant: TURBO DRILL INDUSTRIES, INC., Conroe, TX (US)

(72) Inventor: Chad Feddema, Conroe, TX (US)

(73) Assignee: TURBO DRILL INDUSTRIES, INC., Conroe, TX (US)

( * ) Notice: Subject to any disclaimer, the term of this patent is extended or adjusted under 35 U.S.C. 154(b) by 0 days.

(21) Appl. No.: 19/076,032

(22) Filed: Mar. 11, 2025

(51) Int. Cl.
| F16H 37/04 | (2006.01) |
| E21B 4/00 | (2006.01) |
| E21B 4/02 | (2006.01) |
| F16H 1/46 | (2006.01) |
| F16H 57/08 | (2006.01) |
| F16H 1/32 | (2006.01) |
| F16H 57/04 | (2010.01) |

(52) U.S. Cl.
CPC ............... E21B 4/006 (2013.01); E21B 4/02 (2013.01); F16H 1/46 (2013.01); F16H 57/082 (2013.01); F16H 2001/323 (2013.01); F16H 2001/324 (2013.01); F16H 57/0482 (2013.01)

(58) Field of Classification Search
CPC .... F16H 57/082; F16H 37/041; F16H 57/482; F16H 2001/323; F16H 2001/324; F16H 1/46; E21B 4/006; E21B 4/02
USPC ........ 475/149, 163, 164, 177, 178, 219, 331
See application file for complete search history.

(56) References Cited

U.S. PATENT DOCUMENTS

| 1,790,460 | A | * | 1/1931 | Capeliuschnicoff | .... E21B 4/006 175/107 |
| 4,656,891 | A | * | 4/1987 | Durand | ...... F16H 1/32 475/179 |
| 4,678,045 | A | * | 7/1987 | Lyons | ....... E21B 4/02 175/227 |
| 4,846,018 | A | * | 7/1989 | Matsumoto | .............. B25J 9/102 475/179 |
| 6,520,271 | B1 | | 2/2003 | Martini | |
| 8,602,127 | B2 | | 12/2013 | Hummes | |
| 10,753,152 | B1 | | 8/2020 | Ritchie et al. | |
| 11,560,756 | B2 | | 1/2023 | Schultz et al. | |

OTHER PUBLICATIONS

CN109372952A with English translation; Zhang et al.; Feb. 22, 2019 (Year: 2025).*

* cited by examiner

Primary Examiner — Roger L Pang
(74) Attorney, Agent, or Firm — Ewing & Jones, PLLC (57) ABSTRACT

Apparatus and methods relate to a gear reducer, which may be used downhole to reduce rotational speed output from a downhole motor, such as a turbine motor, to a slower speed desired for rotation of a drill bit. The gear reducer includes a planetary gear arrangement coupled to receive rotational input from the downhole motor and a cycloidal gear arrangement driven by rotation resulting from the planetary gear arrangement. An output shaft couples to the cycloidal gear arrangement and rotates during operation slower than the rotational input from the downhole motor.

18 Claims, 8 Drawing Sheets

GEAR REDUCER

TECHNICAL FIELD/FIELD OF THE DISCLOSURE

The present disclosure relates generally to downhole tools, and specifically to gear reducers for downhole motors.

BACKGROUND OF THE DISCLOSURE

Many downhole tools include downhole motors that may be used to rotate components such as reamers, mills or drill bits for forming wells. The wells may access hydrocarbon-bearing formations in the oil/gas industry. Positive displacement motors (PDM), such as progressive cavity motors, often provide the downhole motors that include a rotor positioned within a stator with rotating components of the bottomhole assembly (BHA) coupled to the rotor.

Conditions including high temperatures in longer/deeper wells can cause problems with elastomers in the PDM. A high speed PDM that limits pressure/torque applied to the elastomers can help mitigate issues with the elastomers in high temperature wells. However, standard drill bits require an increase in torque and reduction of the high speed PDM to acceptable drilling revolutions per minute (RPM).

Turbine motors used as the downhole motors in wells provide benefits for deep drilling including operability in high temperature conditions. The flow rate of drilling fluid and design of the turbine motors often results in the RPM directly output from the turbine motor being higher than desired for using standard drill bits. Prior gear reduction devices are not adapted for the turbine motors, include various operational deficiencies and often result in the RPM directly output from either the high speed PDM or the turbine motor being slowed too much or not enough.

SUMMARY

The present disclosure provides a gear reducer for a downhole motor in a well including a planetary gear arrangement coupled to receive rotational input from the downhole motor. The gear reducer further includes a cycloidal gear arrangement coupled to be driven by rotation resulting from the planetary gear arrangement. An output shaft couples to the cycloidal gear arrangement such that during operation the output shaft rotates slower than the rotational input from the downhole motor.

The present disclosure also provides a method of reducing rotational speed of a downhole motor in a well by providing a gear reducer in the well coupled to receive rotational input from the downhole motor and having an output shaft. The method includes receiving the rotational input from the downhole motor into a planetary gear arrangement of the gear reducer and driving a cycloidal gear arrangement by rotation resulting from the planetary gear arrangement. In addition, the method includes rotating the output shaft coupled to the cycloidal gear arrangement slower than the rotational input from the downhole motor.

Further, the present disclosure provides a downhole assembly for drilling a well including a downhole motor, such as a turbine motor or a positive displacement motor, having a powered rotor. A gear reducer of the downhole assembly includes a ring gear coupled to rotate with the powered rotor of the downhole motor, a first planetary gear meshed with the ring gear and disposed on a first crankshaft, a second planetary gear meshed with the ring gear and disposed on a second crankshaft, a first cycloidal rotor partially meshed with teeth inside a cycloidal stator, a second cycloidal rotor partially meshed with the teeth inside the cycloidal stator, and an output shaft having a top end with first and second bores to respectively receive bottom ends of the first and second crankshafts that are rotated together about a center rotational axis of the output shaft by the first and second cycloidal rotors. A first offset cam of the first crankshaft passes through the first cycloidal rotor and a second offset cam of the second crankshaft passes through the first cycloidal rotor. Further, a third offset cam of the first crankshaft passes through the second cycloidal rotor and a fourth offset cam of the second crankshaft passes through the second cycloidal rotor. The downhole assembly also includes a drill bit coupled to rotate with the output shaft of the gear reducer.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
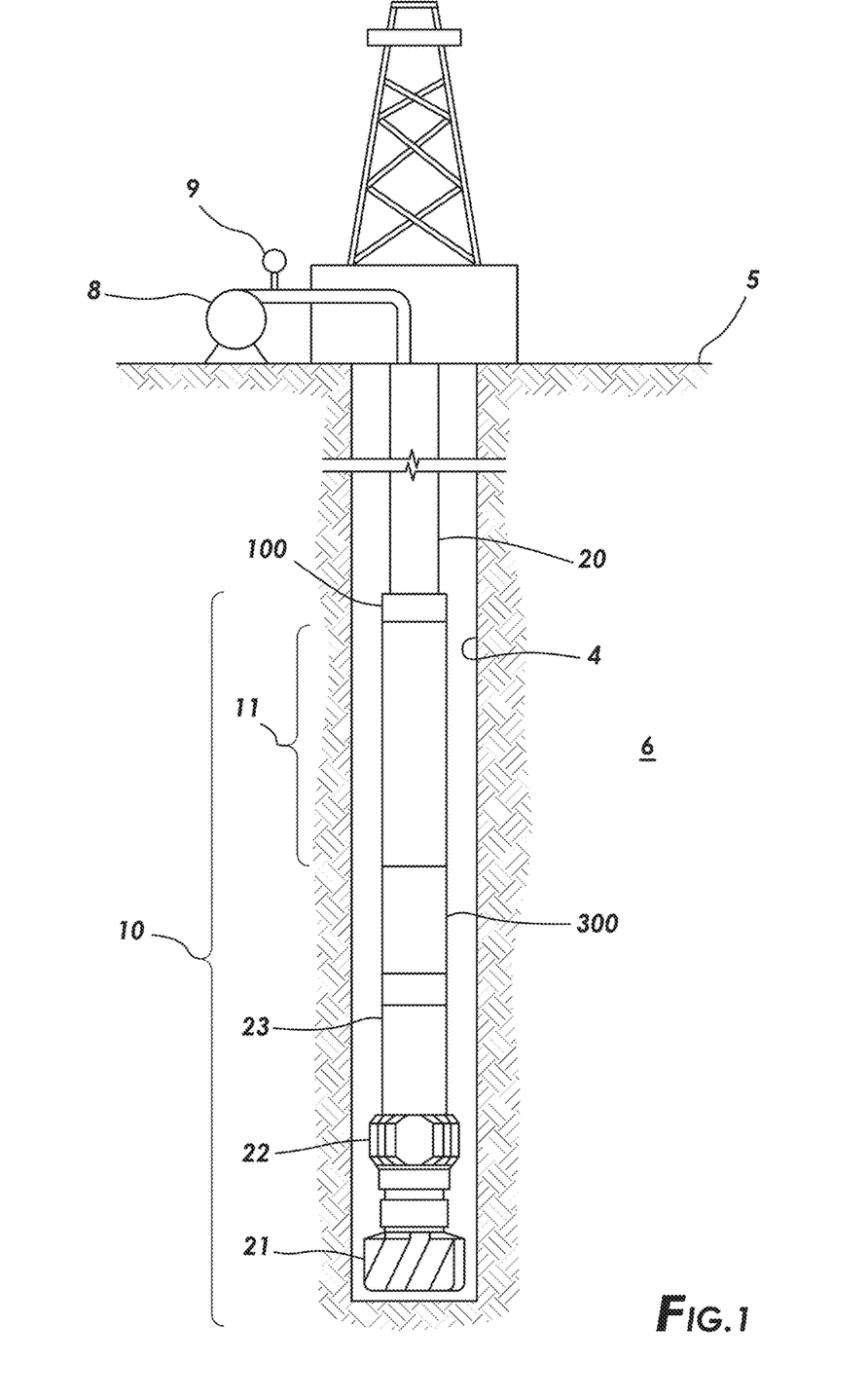
FIG. 1 is a schematic view of a drill string positioned in a wellbore, the drill string including a gear reducer consistent with at least one embodiment of the present disclosure.

FIG. 1 depicts wellbore 4 during a drilling operation of wellbore 4. Wellbore 4 may extend from surface 5 into earthen formation 6 and may be formed using drill string 20.

One or more pumps 8 may be positioned at surface 5 to provide fluid flow through drill string 20. In some embodiments, gauge 9 may be positioned at surface 5 to measure the pressure and/or flow rate within drill string 20.

In some embodiments, drill string 20 may include bottomhole assembly (BHA) 10 positioned within wellbore 4. In some embodiments, bottomhole assembly 10 may include top sub 100 coupling the drill string 20 to power section 11, which may include a turbine motor or a positive displacement motor (PDM), such as a progressive cavity motor. In some embodiments, BHA 10 may include one or more rotating components including, for example and without limitation, drill bit 21 as well as additional components such as rotary steerable system 22. The rotating components of BHA 10 may be secured to a rotor of power section 11 via a gear reducer 300, which operates to increase torque and lower revolutions per minute (RPM) relative to output from power section 11. In some embodiments, BHA 10 may include one or more components configured to axially support the rotating components of BHA 10 when drill bit 21 is raised off the bottom of wellbore 4 including, for example and without limitation, bearing section 23.

Figure 2:
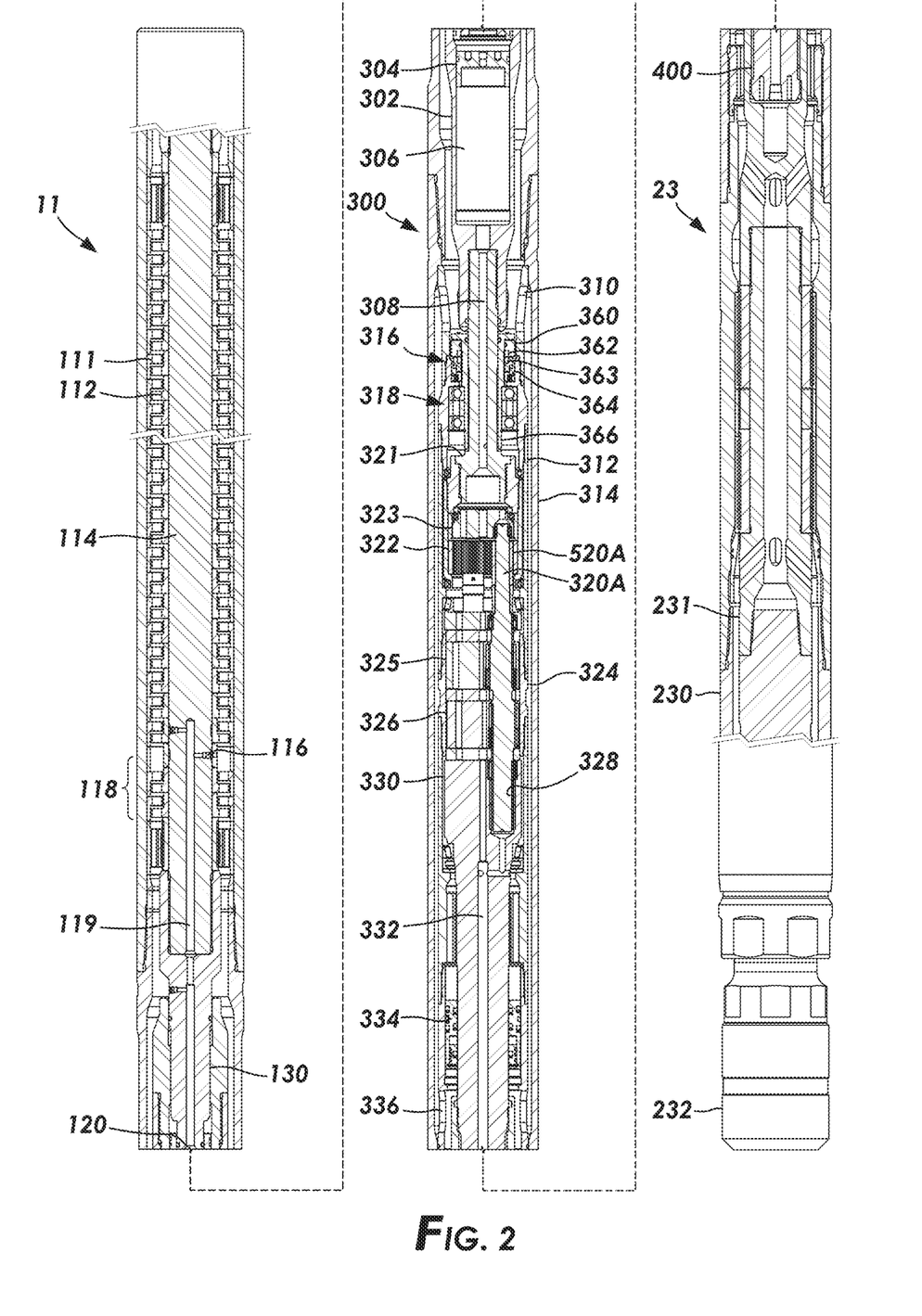
FIG. 2 is a cross-section view of a gear reducer between power and bearing sections of the drill string consistent with at least one embodiment of the present disclosure.

FIG. 2 shows the gear reducer 300 between power section 11 and bearing section 23. Power section 11 in some embodiments includes a turbine motor having a plurality of inward oriented stator turbine blades 111 interleaved between a plurality of rotor turbine blades 112 fixed to and extending outward from a powered rotor 114 that is disposed to rotate centrally within the stator turbine blades 111. Flow rate of drilling fluid as desired for drilling operations through the stator and rotor turbine blades 111, 112 determines RPM of the power section 11. Based on each set of the stator and rotor turbine blades 111, 112 providing a stage, torque of the power section 11 corresponds with number of the stages. Therefore, selecting the length of the power section 11 provides desired torque after the gear reducer 300 to the drill bit 21. The power section 11 before the gear reducer 300 may output through the powered rotor 114 a higher RPM and lower torque than desired for drilling operations.

To provide standard rotating direction of the drill bit 21 when using the gear reducer 300 described herein, angle of the stator and rotor turbine blades 111, 112 makes for lefthand blade orientation and hence lefthand (counterclockwise) rotation of the powered rotor 114. Typical downhole turbine motors may include righthand blade orientation with such resulting righthand (clockwise) rotation directly used for drilling operations without ever switching rotation direction. In some embodiments, the gear reducer 300 may be modified to accept righthand rotation or the drill bit 21 may be designed for lefthand rotation. For example, using a ring gear driven planetary system may rely on lefthand input. However, some embodiments use a sun gear driven planetary system (e.g., instead of a ring gear, a centrally disposed sun gear driven by power section 11 mates with and is disposed between crankshafts to operate as described herein) for righthand input to maintain righthand output.

A lower end of the power section 11 includes a positive pressure port 116 in fluid communication with the drilling fluid at a point among the stator and rotor turbine blades 111, 112 before a last set of the stator and rotor turbine blades 111, 112. The positive pressure port 116 above final two stages 118 results in the drilling fluid entering the positive pressure port 116 being at a higher pressure than the drilling fluid below the final two stages 118. While dependent on drilling fluid weight, drilling fluid pressure drops about 15 pounds per square inch per stage (depending on fluid density and flow rate) of the stator and rotor turbine blades 111, 112. In operation, the positive pressure port 116 extends radially through powered rotor 114 and supplies the drilling fluid through channel 119 and out of terminal opening 120 of the powered rotor 114 to act on a floating balance piston 304 of the gear reducer 300. In some embodiments, an inlet for the drilling fluid may be disposed below all the turbine stages or, if the PDM is used instead of the turbine motor, below the PDM of the power section 11 for supply of the drilling fluid through the drilling fluid through channel 119 to the floating balance piston 304 without having the positive pressure.

Power section 11 and the gear reducer 300 couple via a spline connection 130. The spline connection 130 inputs rotation from power section 11 to the gear reducer 300. The transfer of rotation may be through sub(s), such as shown by the powered rotor 114, which as defined herein extends to the terminal opening 120 without being formed by a single piece.

A top of the gear reducer 300 includes a lubricator housing 302 coupled to and below the spline connection 130. The lubricator housing 302 defines a lubricant chamber 306 that is pressurized by the floating balance piston 304 being urged by the drilling fluid from the positive pressure port 116 to decrease volume of the lubricant chamber 306. Lubricant within the lubricant chamber 306 thus remains pressurized for passing the lubricant through supply lubricant pathway 308 to internal areas of the gear reducer 300 and for lubricant movement within the gear reducer 300 in operation of the gear reducer 300. Fluid communication between the supply lubricant pathway 308 and lower lubricant pathways 332 encompasses bearing/rotating areas for lubrication within the gear reducer 300. The positive pressure of the lubricant in the lubricant chamber 306 overcomes any leakage of the lubricant from the gear reducer 300.

Prior to make up of the drill string 20 and deployment in wellbore 4, the lower lubricant pathways 332 enable filling of the gear reducer 300 with the lubricant where the lower lubricant pathways 332 terminate from bottom end face of an output shaft 330 of the gear reducer 300. The lower lubricant pathways 332 also provide fluid communication of the lubricant to a floating barrier piston 334 disposed in an annular area between the output shaft 330 of the gear reducer 300 and an inner housing 312 of the gear reducer 300. The drilling fluid acts on an opposing side of the floating barrier piston 334 from the lubricant. Flow of the drilling fluid from power section 11 passes through drilling fluid upper flow slots 310 in the inner housing 312 and travels along an annular area between the inner housing 312 of the gear reducer 300 and an outer housing 314 of the gear reducer 300 before passing through drilling fluid lower flow slots 336 in the inner housing 312 proximate the floating barrier piston 334.

The inner housing 312 of the gear reducer 300 holds components of the gear reducer 300 including mechanical seal assembly 316, radial and thrust bearing assembly 318, a ring gear driver 321, a ring gear 322, multiple thrust and radial alignment bearings 342, three crankshafts 320A, 320B, 320C (all three visible in FIGS. 8 and 9, and some embodiments may use two or more), a first cycloidal rotor 325, a second cycloidal rotor 326, and the output shaft 330. While depicted with the three crankshafts 320A, 320B, 320C, the gear reducer 300 may operate with fewer or more crankshafts, such as two to six crankshafts. For example, additional crankshafts may be desired for larger downhole tools. While shown with the first and second cycloidal rotors 325, 326, the gear reducer 300 may also use additional cycloidal rotors to reduce radial load per rotor. By way of example, the gear reducer 300 may use up to four sets of cycloidal rotors.

Part of the inner housing 312 corresponding with longitudinal location along the gear reducer 300 of the first and second cycloidal rotors 325, 326 includes a cycloidal stator 324 for operational engagement with the first and second cycloidal rotors 325, 326. Upper sections of the crankshafts 320A, 320B, 320C include respective planetary gears 520A, 520B, 520C for operational engagement with the ring gear 322. The crankshafts 320A, 320B, 320C extend downward from the planetary gears 520A, 520B, 520C through bores in the first and second cycloidal rotors 325, 326 and into respective receptacle bores 328 of the output shaft 330 at bottom ends of the crankshafts 320A, 320B, 320C. The receptacle bores 328 of the output shaft 330 along with a radial support member 323 that receives top ends of the crankshafts 320A, 320B, 320C above the planetary gears 520A, 520B, 520C maintains the crankshafts 320A, 320B, 320C arranged operationally in the gear reducer 300.

Mechanical seal assembly 316 and radial and thrust bearing assembly 318 hold the ring gear driver 321 rotating within the inner housing 312 while trapping the lubricant in the inner housing 312 where the lubricant is protecting the gear reducer 300. In some embodiments, an inner race 366 keyed and static sealed to the ring gear driver 321 thus rotates with the ring gear driver 321 and includes an upper radially outward flange axially retaining mechanical seal assembly 316. The inner race 366 may extend along the ring gear driver 321 up to where the ring gear driver 321 is threaded into a female end of the lubricator housing 302. A radially inward flange of the inner housing 312 between mechanical seal assembly 316 and radial and thrust bearing assembly 318 may axially retain the radial and thrust bearing assembly 318 in the annulus between the inner housing 312 and the inner race 366.

Mechanical seal assembly 316 may seal the annulus between the inner race 366 and the inner housing 312 using a rotating seal carrier 360 coupled to rotate with the inner race 366 and a stationary seal carrier 364 fixed rotationally to the inner housing 312. Biasing, such as by a spring, of one, or both, of the rotating and stationary seal carriers 360, 364 urges a rotating seal 362 and a stationary seal 363 that are respectively retained by the rotating and stationary seal carriers 360, 364 into sealing contact. A carbide material may form both the rotating and stationary seals 362, 363 to provide a carbide face seal suitable for high-speed application. Static seals at appropriate locations between various components of mechanical seal assembly 316, inner housing 312 and inner race 366 that lack relative movement further may facilitate sealing of the annulus between the inner race 366 and the inner housing 312.

Figure 3:
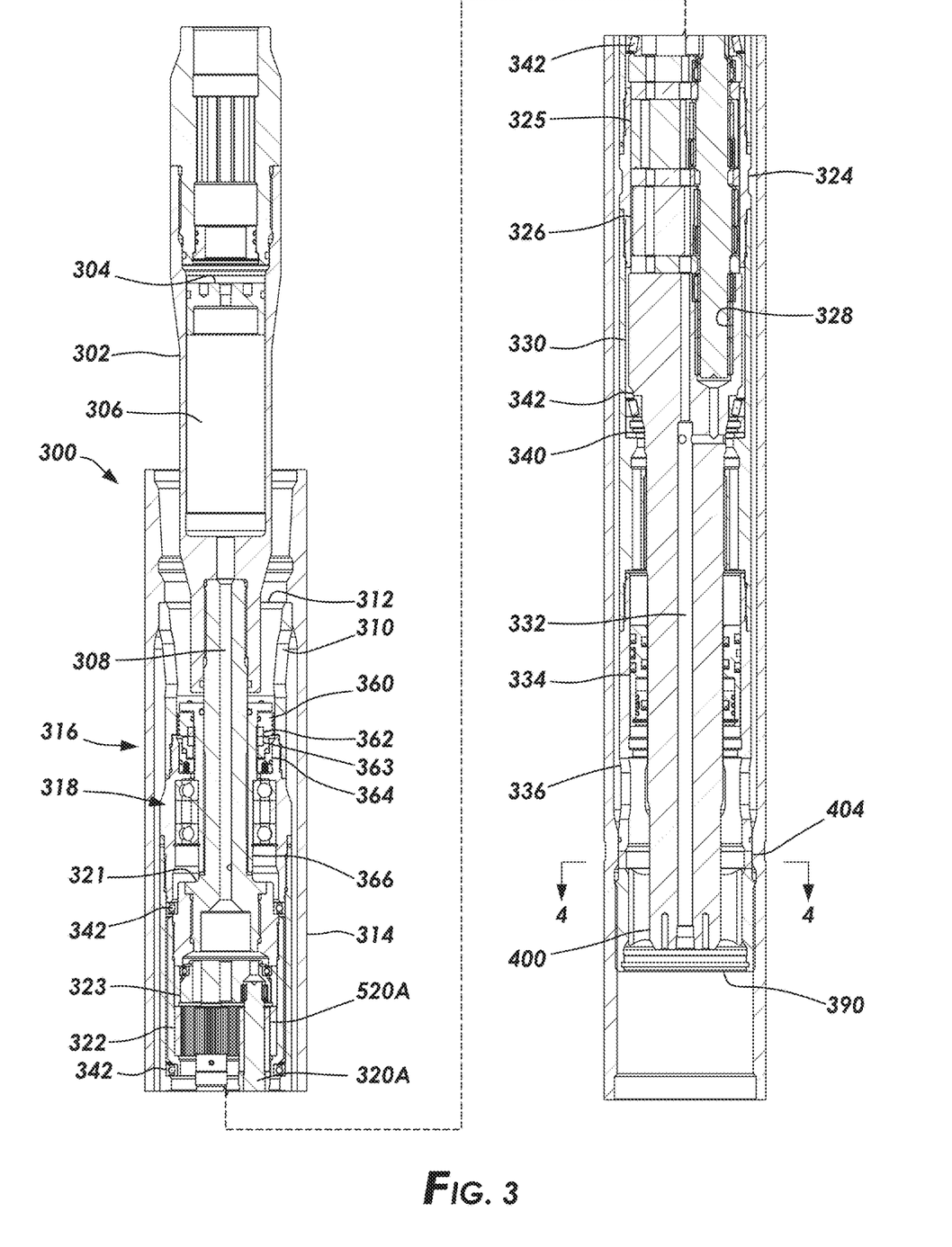
FIG. 3 is a cross-section view of the gear reducer for coupling to the power and bearing sections as shown in FIG. 2.

FIG. 3 illustrates the gear reducer 300 alone. The inner housing 312 of the gear reducer may include several tubular shaped elements including the cycloidal stator 324 all threaded together. Radially inward shoulders along the inner housing 312 may support the thrust and radial alignment bearings 342 at desired locations. A preload spring, such as a Belleville disc spring 340 or stack, facilitates the thrust and radial alignment bearings 342 carrying load during operation of the gear reducer 300. Further, a lock nut 390 and keyed ring 404 together enable compressing the inner housing 312 to facilitate axially and radially aligning operational features of the gear reducer 300.

Figure 4:
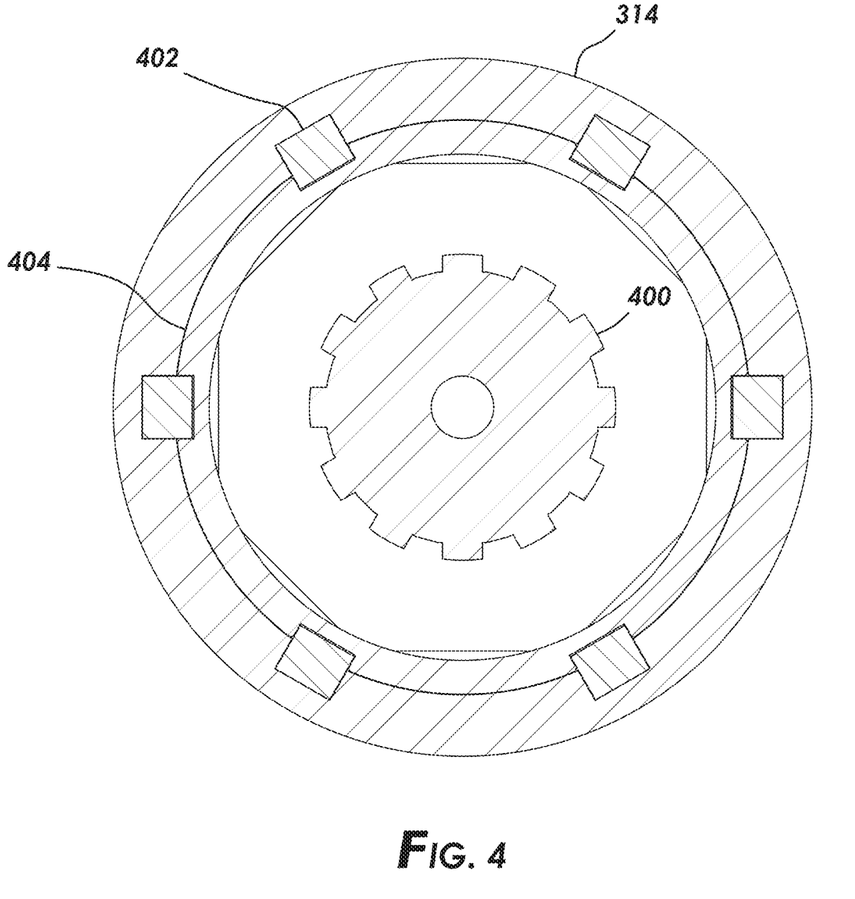
FIG. 4 is a cross-section view at the bottom end of the gear reducer taken across line 4-4 in FIG. 3.

FIG. 4 shows a lower section of the gear reducer 300 where keys 402 of the keyed ring 404 mate with longitudinal grooves inside of the outer housing 314. During assembly of the outer housing 314 around the inner housing 312, the inner housing 312 inserts into the outer housing 314 until the top edge of the inner housing 312 abuts a radial inward shoulder of the outer housing 314. The lock nut 390 threads to the outer housing 314 and includes an internal profile, such as a hex socket, for engagement with a tool or wrench to torque the connection with the outer housing 314. The keyed ring 404 prevents transfer of the torque from the lock nut 390, which may be less than torque of threaded connections within the inner housing 312, to the inner housing 312 while still applying the desired compression to the inner housing 312. Splines 400 at a bottom end of the output shaft 330 for coupling the gear reducer 300 to bearing section 23 and the spline connection 130 between the gear reducer 300 and power section 11 permit axial displacement independent of torque connecting the outer housing 314 with power and bearing sections 11, 23.

Referring back to FIG. 2, the splines 400 of the output shaft 330 transfer low RPM, high torque and righthand rotation to an internal driveline 231 of bearing section 23 relative to rotational input from power section 11 to the gear reducer 300. Bearing section 23 includes bearing housing 230, such as a straight housing, fixed bend housing, or adjustable bend housing. The bottom end of bearing section 23 includes a bit coupler 232, which may include a box connection if coupling to the drill bit 21 or a pin connection if, for example, coupling to rotary steerable system 22. The internal driveline 231 may include a flex shaft, single articulated shaft or double articulated shaft used to deliver rotation output by the gear reducer 300 to the bit coupler 232.

Figure 5:
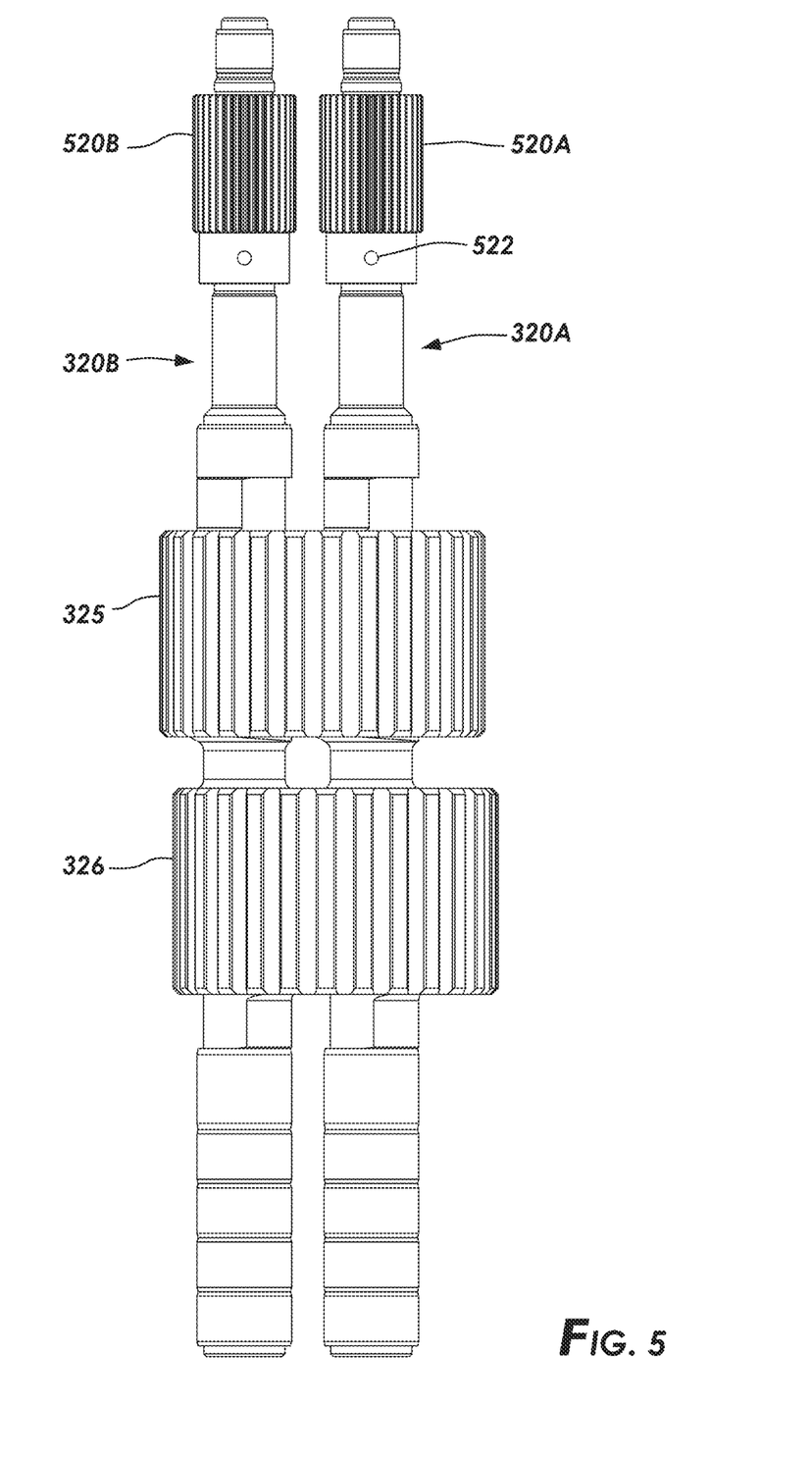
FIG. 5 is a side view of cycloidal rotors driven by crankshafts rotating within the gear reducer.

FIG. 5 depicts certain internal components of the gear reducer 300 selected to describe operation of the gear reducer 300 including the first and second cycloidal rotors 325, 326 driven by rotation of the crankshafts 320A, 320B, 320C. The first and second cycloidal rotors 325, 326 each have a cylindrical shape with external teeth and centerlines offset from an axis of rotation along input/output rotations of the gear reducer 300. The offset of the first cycloidal rotor 325 is timed to be 180 degrees from the second cycloidal rotor 326. In operation, the offset balances eccentricity of the first and second cycloidal rotors 325, 326 to at least limit vibrations.

Each of the planetary gears 520A, 520B, 520C are tubular shaped to slide over the crankshafts 320A, 320B, 320C and have external teeth. Set screws and timing keyed drivers 522 may secure the planetary gears 520A, 520B, 520C to the crankshafts 320A, 320B, 320C. The planetary gears 520A, 520B, 520C may wear more than other parts of the gear reducer 300 and hence are able to be removed and replaced during servicing of the gear reducer 300.

Figure 6:
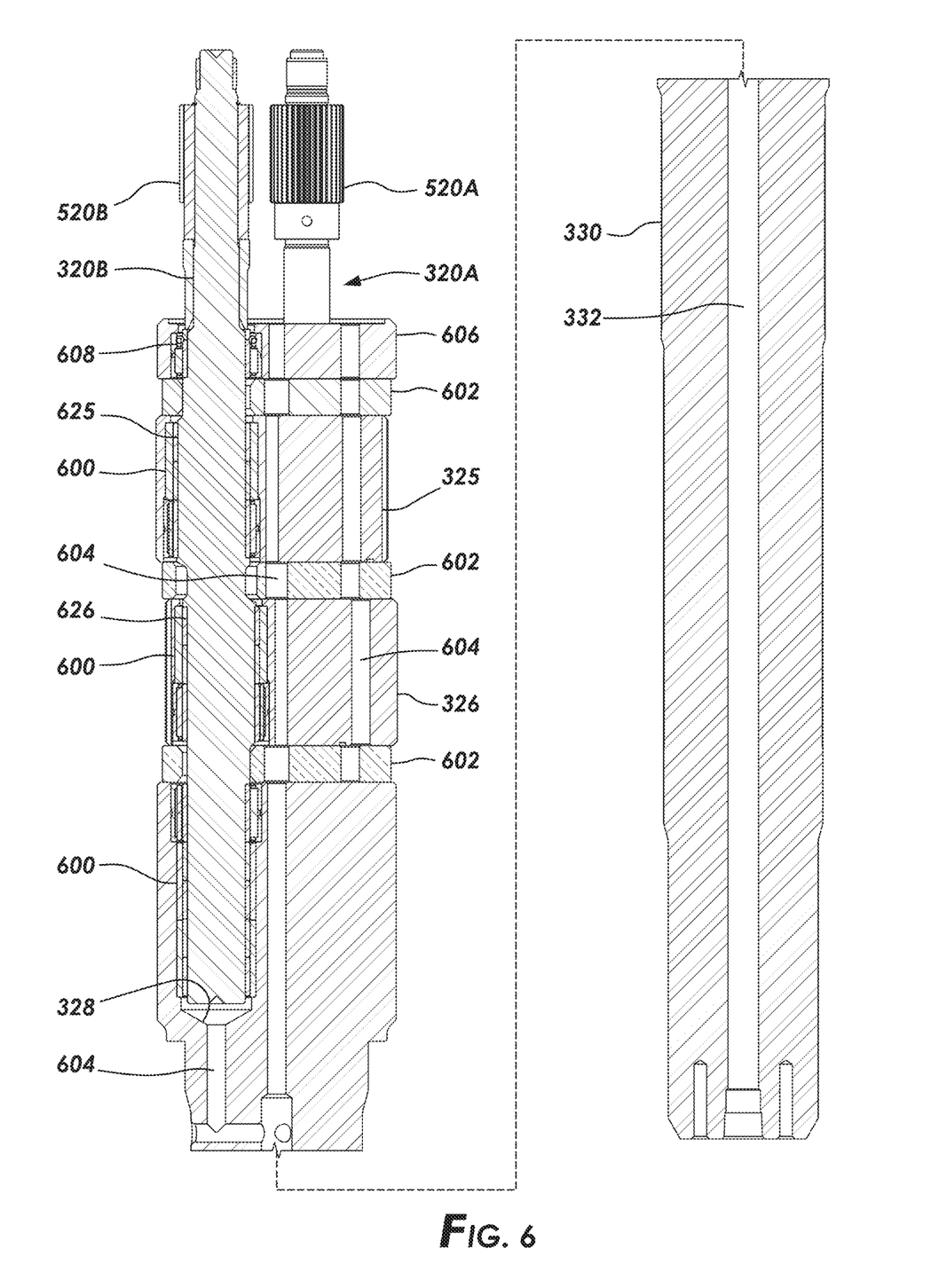
FIG. 6 is a cross-section view of the cycloidal rotors driven by the crankshafts to rotate an output shaft within the gear reducer.

FIG. 6 shows the output shaft 330 of the gear reducer 300 along with the first and second cycloidal rotors 325, 326 and the crankshafts 320A, 320B, 320C. While each of the crankshafts 320A, 320B, 320C have respective features even though only one of the crankshaft's entire length is visible, a first offset cam 625 along length of the crankshaft 320B where the crankshaft 320B passes through the first cycloidal rotor 325 results in longitudinal center of the first offset cam 625 being displaced from rotational axis of the crankshaft 320B. A second offset cam 626 along length of the crankshaft 320B where the crankshaft 320B passes through the second cycloidal rotor 326 results in longitudinal center of the second offset cam 626 being displaced from rotational axis of the crankshaft 320B and 180 degrees apart from the first offset cam 625.

Thrust plates 602 maintain position of the first and second cycloidal rotors 325, 326 in the gear reducer 300. The thrust plates 602 provide low friction surfaces and are disposed above the first cycloidal rotor 325, between the first and second cycloidal rotors 325, 326 and below the second cycloidal rotor 326 on top of the output shaft 330. Middle lubricant pathways 604 (as exemplarily identified in FIG. 6. longitudinally through the thrust plates 602, from the receptacle bores 328 of the output shaft 330 and longitudinally through the second cycloidal rotor 326) along with outer surfaces shown in FIG. 6 that function inside of the inner housing 312 provide various flow paths for lubricant between the supply lubricant pathway 308 and the lower lubricant pathways 332.

The inner housing 312 retains an axial support member 606 above one of the thrust plates 602 on top of the first cycloidal rotor 325. The axial support member 606 includes crankshaft axial alignment bearings 608 that engage the crankshafts 320A, 320B, 320C. Multiple radial alignment and torsional load bearings 600 also surround and engage the crankshafts 320A, 320B, 320C at locations such as at the axial support member 606, the first and second cycloidal rotors 325, 326 and the receptacle bores 328 of the output shaft 330.

Figure 7:
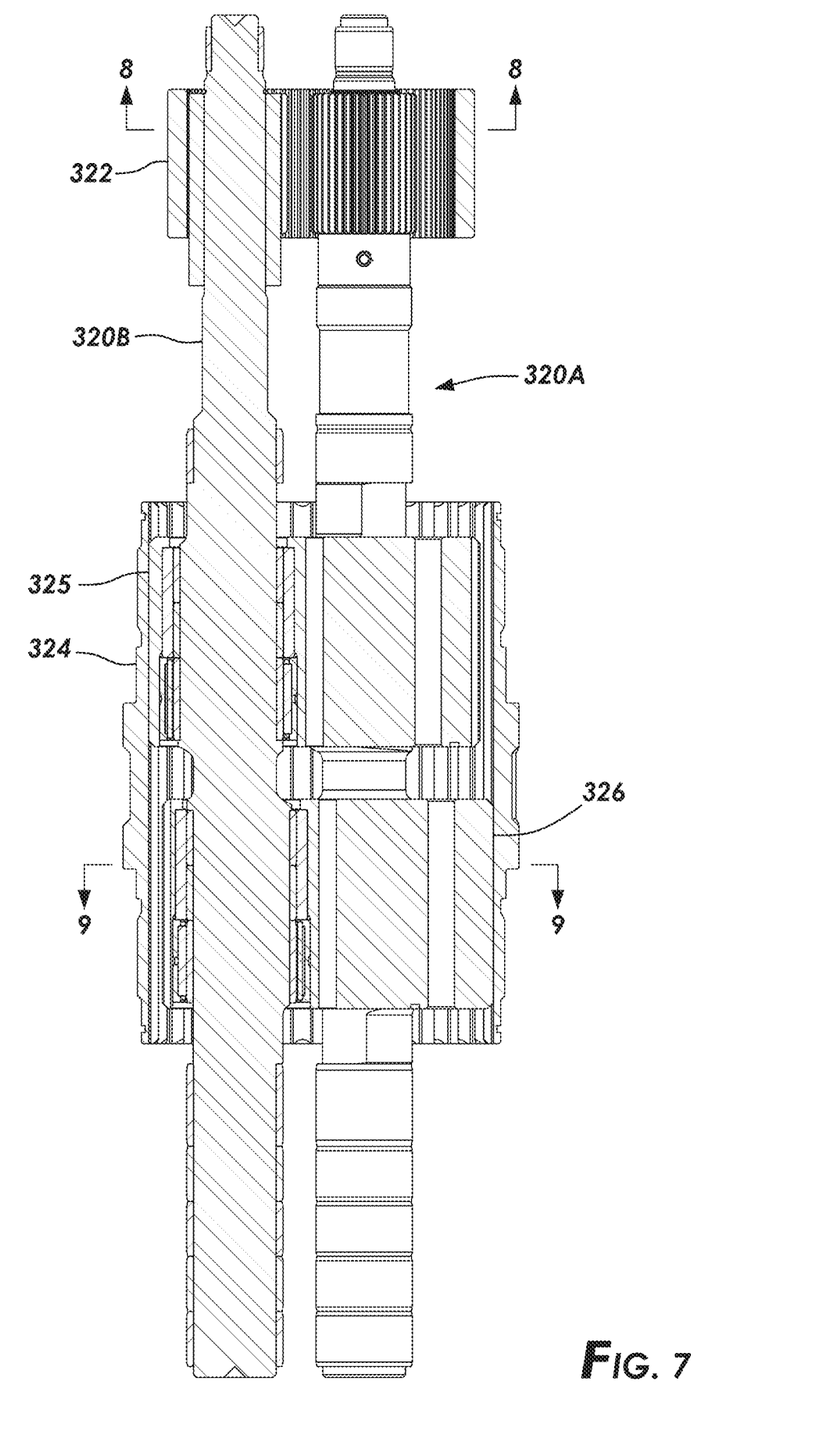
FIG. 7 is a cross-section view of the cycloidal rotors within a cycloidal stator of the gear reducer and the crankshafts planetary meshed to a ring gear of the gear reducer.

FIG. 7 illustrates the first and second cycloidal rotors 325, 326 within the cycloidal stator 324 of the gear reducer 300 and the crankshafts 320A, 320B, 320C planetary meshed to the ring gear 322 of the gear reducer 300. To provide this cycloidal gear arrangement, the max outside diameter at teeth crests of the first and second cycloidal rotors 325, 326 is less than the inside diameter from teeth root to crest of the cycloidal stator 324. In the position shown, the first cycloidal rotor 325 thus has teeth cycloidal meshed with teeth of the cycloidal stator 324 toward the left side and displaced with a gap between teeth of the first cycloidal rotor 325 and the cycloidal stator 324 toward the right side. At the same position, the second cycloidal rotor 326 thus has teeth cycloidal meshed with teeth of the cycloidal stator 324 toward the right side and displaced with a gap between teeth of the second cycloidal rotor 326 and the cycloidal stator 324 toward the left side.

Figure 8:
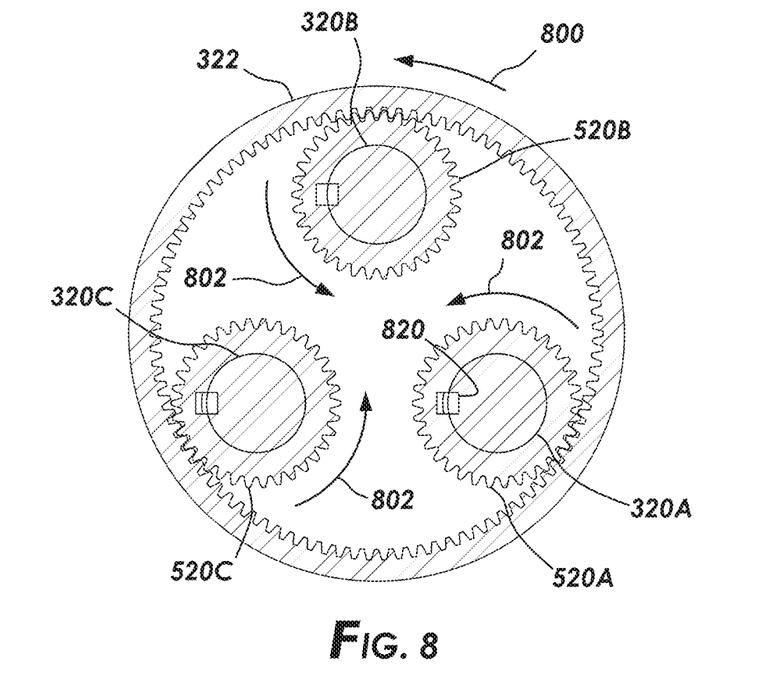
FIG. 8 is a cross-section view taken across line 8-8 in FIG. 7 illustrating rotation of the ring gear by the power section to rotate the crankshafts.

FIG. 8 depicts rotation, which is represented by input arrow 800, of the ring gear 322 driven by power section 11 to individually rotate the planetary gears 520A, 520B, 520C as represented by planetary arrows 802. A rotational locking member 820 extending into outside grooves of the crankshafts 320A, 320B, 320C and corresponding inside grooves of the planetary gears 520A, 520B, 520C may rotationally lock the crankshafts 320A, 320B, 320C to turn with the planetary gears 520A, 520B, 520C. This planetary gear arrangement results in increasing RPM of each of the crankshafts 320A, 320B, 320C turning on own rotational axis individually relative to RPM of the ring gear 322. The lefthand rotation of the ring gear 322 corresponding with output from power section 11 translates to lefthand rotation of the crankshafts 320A, 320B, 320C.

Figure 9:
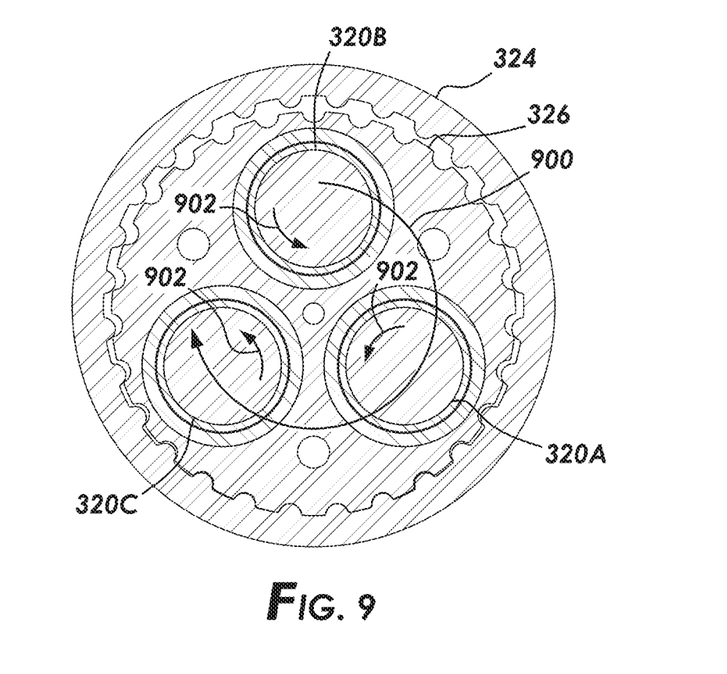
FIG. 9 is a cross-section view taken across line 9-9 in FIG. 7 illustrating rotation of the crankshafts to rotate one of the cycloidal rotors cycloidal meshed with the cycloidal stator.

FIG. 9 illustrates individual rotation for each of the crankshafts 320A, 320B, 320C as represented by crankshaft arrows 902 to rotate, which is represented by output arrow 900, the second cycloidal rotor 326 cycloidal meshed with the cycloidal stator 324. The first and second cycloidal rotors 325, 326 each have fewer teeth than the cycloidal stator 324. For example, the first and second cycloidal rotors 325, 326 may generate a 28:1 reduction by each having 27 teeth as shown while the cycloidal stator 324 has 28 teeth. The gap between teeth of the second cycloidal rotor 326 and the cycloidal stator 324 moves 360 degrees around as the second cycloidal rotor 326 makes one revolution engaging the teeth around the cycloidal stator 324 along the way.

In operation, the rotation of the crankshafts 320A, 320B, 320C having the second offset cam 626 within the second cycloidal rotor 326 functions to move the second cycloidal rotor 326 around the cycloidal stator 324 resulting in the rotation of the second cycloidal rotor 326 in a righthand direction. The crankshafts 320A, 320B, 320C thereby also rotate together about the longitudinal axis between the crankshafts 320A, 320B, 320C since disposed through the second cycloidal rotor 326 and the first cycloidal rotor 325 that is likewise rotating. As apparent in FIG. 2, this rotation together about the longitudinal axis between the crankshafts 320A, 320B, 320C coincides with rotational axis of the output shaft 330 and causes the output shaft 330 rotation due to the ends of the crankshafts 320A, 320B, 320C being disposed in the receptacle bores 328 of the output shaft 330.

By way of example, the gear reducer 300 may provide RPM reduction of between 8:1 and 12:1, such as 10.13:1. The RPM reduction may come from a combination of increasing the RPM 2-4 times, such as 2.76 times, from power section 11 to the crankshafts 320A, 320B, 320C individually via planetary gears and then reducing the RPM between 20:1 and 300:1, such as 28:1, with the first and second cycloidal rotors 325, 326. In some embodiments, power section 11 may output based on drilling fluid flow rate more than 1000 RPM or 1500-5000 RPM, the crankshafts 320A, 320B, 320C may individually rotate at 3200-6400 RPM and, following reduction by the first and second cycloidal rotors 325, 326, the output shaft 330 of the gear reducer 300 may provide rotation to the drill bit 21 of 40-450 RPM dependent on load, such as about 150-200 RPM.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A gear reducer for a downhole motor in a well, comprising:
   a planetary gear arrangement coupled to receive rotational input from the downhole motor, wherein the planetary gear arrangement comprises:
   a ring gear coupled to rotate with a powered rotor of the downhole motor;
   a first planetary gear meshed with the ring gear and disposed on the first crankshaft; and
   a second planetary gear meshed with the ring gear and disposed on a second crankshaft;
   a cycloidal gear arrangement coupled to be driven by rotation resulting from the planetary gear arrangement; and
   an output shaft coupled to the cycloidal gear arrangement, wherein during operation the output shaft rotates slower than the rotational input from the downhole motor.

2. The gear reducer of claim 1, wherein the cycloidal gear arrangement comprises:
- a first cycloidal rotor partially meshed with teeth inside a cycloidal stator, wherein a first offset cam of the first crankshaft passes through the first cycloidal rotor and a second offset cam of the second crankshaft passes through the first cycloidal rotor; and
- a second cycloidal rotor partially meshed with the teeth inside the cycloidal stator, wherein a third offset cam of the first crankshaft passes through the second cycloidal rotor and a fourth offset cam of the second crankshaft passes through the second cycloidal rotor.

3. The gear reducer of claim 2, wherein the output shaft has a top end with first and second bores to respectively receive bottom ends of the first and second crankshafts that are rotated together about a center rotational axis of the output shaft by the first and second cycloidal rotors.

4. The gear reducer of claim 1, wherein during operation the rotational input from the downhole motor is at a first revolutions per minute (RPM) and crankshafts of the planetary gear arrangement individually rotate during operation at a second RPM greater than the first RPM.

5. The gear reducer of claim 1, wherein the output shaft rotates slower than the rotational input from the downhole motor due to increasing revolutions per minute (RPM) with the planetary gear arrangement and then decreasing RPM with the cycloidal gear arrangement.

6. The gear reducer of claim 1, wherein during operation the rotational input from the downhole motor is lefthand rotation opposite of righthand rotation of the output shaft.

7. The gear reducer of claim 1, further comprising a positive pressure lubricant supply to the planetary and cycloidal gear arrangements, wherein the positive pressure lubricant supply includes a piston acted on by drilling fluid taken at least one stage up along a turbine motor that is the downhole motor.

8. A method of reducing rotational speed of a downhole motor in a well, comprising:
- providing a gear reducer in the well coupled to receive rotational input from the downhole motor and having an output shaft;
- receiving the rotational input from the downhole motor into a planetary gear arrangement of the gear reducer;
- driving a cycloidal gear arrangement by rotation resulting from the planetary gear arrangement; and
- rotating the output shaft coupled to the cycloidal gear arrangement slower than the rotational input from the downhole motor;
- wherein the output shaft rotates slower than the rotational input from the downhole motor due to increasing revolutions per minute (RPM) with the planetary gear arrangement and then decreasing RPM with the cycloidal gear arrangement.

9. The method of claim 8, wherein the gear reducer receives rotational input from the downhole motor that is a turbine motor.

10. The method of claim 8, wherein the planetary gear arrangement of the gear reducer is a sun gear driven planetary system.

11. The method of claim 8, wherein the rotational input from the downhole motor is lefthand rotation opposite of righthand rotation of the output shaft.

12. The method of claim 8, further comprising supplying lubricant to the planetary and cycloidal gear arrangements, wherein a piston acted on by drilling fluid taken at least one stage up along a turbine motor that is the downhole motor pressurizes the lubricant.

13. A downhole assembly for drilling a well, comprising:
- a downhole motor having a powered rotor, wherein the downhole motor is one of a turbine motor and a positive displacement motor;
- a gear reducer, comprising:
  - a ring gear coupled to rotate with the powered rotor of the downhole motor;
  - a first planetary gear meshed with the ring gear and disposed on a first crankshaft;
  - a second planetary gear meshed with the ring gear and disposed on a second crankshaft;
  - a first cycloidal rotor partially meshed with teeth inside a cycloidal stator, wherein a first offset cam of the first crankshaft passes through the first cycloidal rotor and a second offset cam of the second crankshaft passes through the first cycloidal rotor;
  - a second cycloidal rotor partially meshed with the teeth inside the cycloidal stator, wherein a third offset cam of the first crankshaft passes through the second cycloidal rotor and a fourth offset cam of the second crankshaft passes through the second cycloidal rotor; and
  - an output shaft having a top end with first and second bores to respectively receive bottom ends of the first and second crankshafts that are rotated together about a center rotational axis of the output shaft by the first and second cycloidal rotors; and
- a drill bit coupled to rotate with the output shaft of the gear reducer.

14. The downhole assembly of claim 13, wherein the downhole motor is the turbine motor.

15. The downhole assembly of claim 14, wherein the gear reducer further comprises a positive pressure lubricant supply with a piston acted on by drilling fluid taken at least one stage up along the turbine motor.

16. The downhole assembly of claim 13, wherein the teeth inside the cycloidal stator are at least one more than on outside of each of the first and second cycloidal rotors.

17. The downhole assembly of claim 13, wherein the first and second cycloidal rotors are offset 180 degrees such that the first cycloidal rotor is partially meshed with the teeth inside the cycloidal stator on an opposite side of the cycloidal stator from where the second cycloidal rotor is partially meshed with the teeth inside the cycloidal stator.

18. The downhole assembly of claim 13, wherein gear reducer further comprises a third planetary gear meshed with the ring gear and disposed on a third crankshaft.

* * * * *

UNITED STATES PATENT AND TRADEMARK OFFICE
CERTIFICATE OF CORRECTION

PATENT NO. : 12,428,910 B1
APPLICATION NO. : 19/076032
DATED : September 30, 2025
INVENTOR(S) : Feddema Page 1 of 1

It is certified that error appears in the above-identified patent and that said Letters Patent is hereby corrected as shown below:

In the Claims

Claim 1 Column 8, Line 58:
"disposed on the first crankshaft; and"
Should read:
"disposed on a first crankshaft; and"

Signed and Sealed this
Twenty-fifth Day of November, 2025

John A. Squires
*Director of the United States Patent and Trademark Office*